Figure 4:
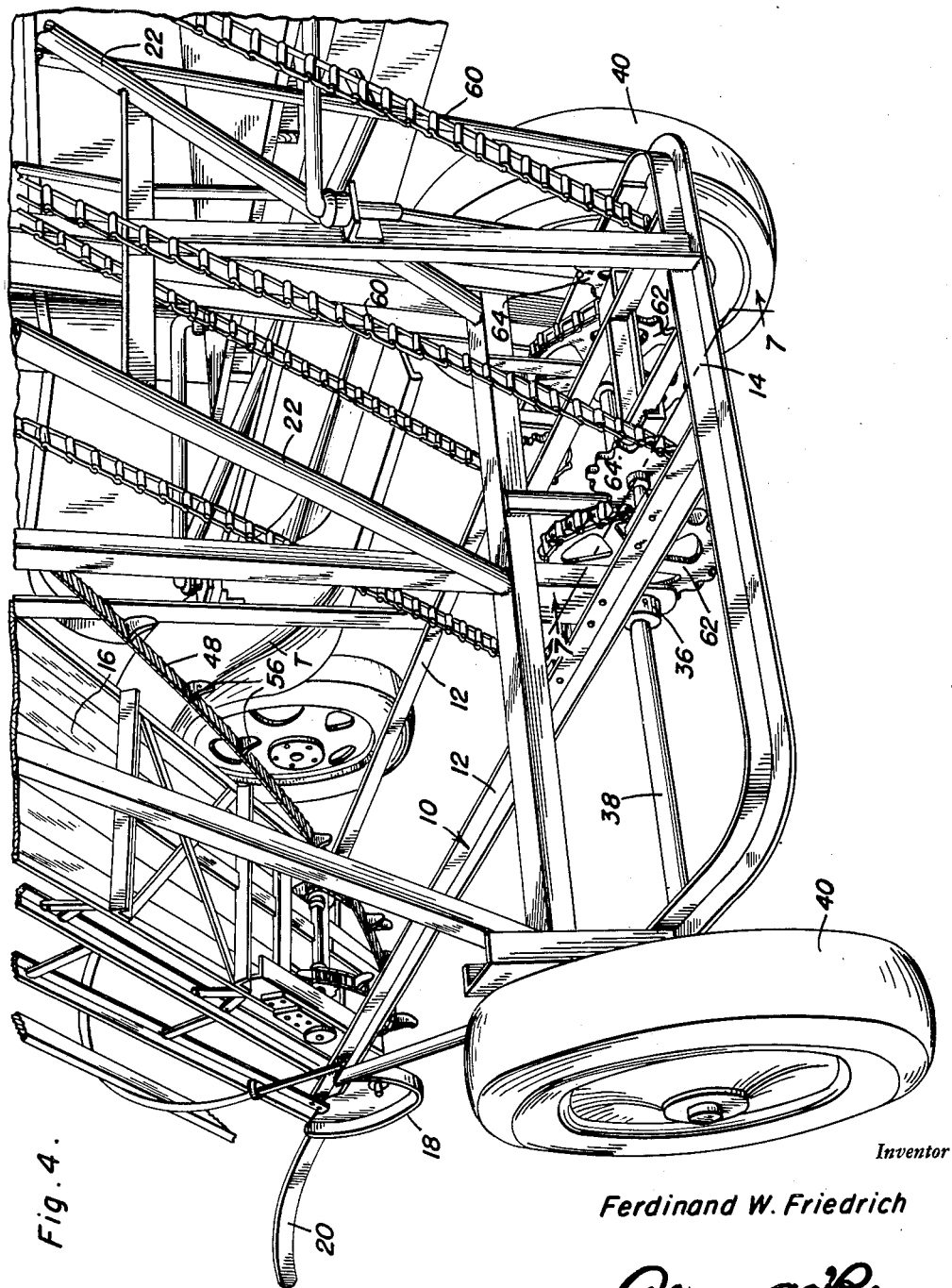

May 16, 1950  F. W. FRIEDRICH  2,507,627
BALE LOADER
Filed May 7, 1948  4 Sheets-Sheet 1
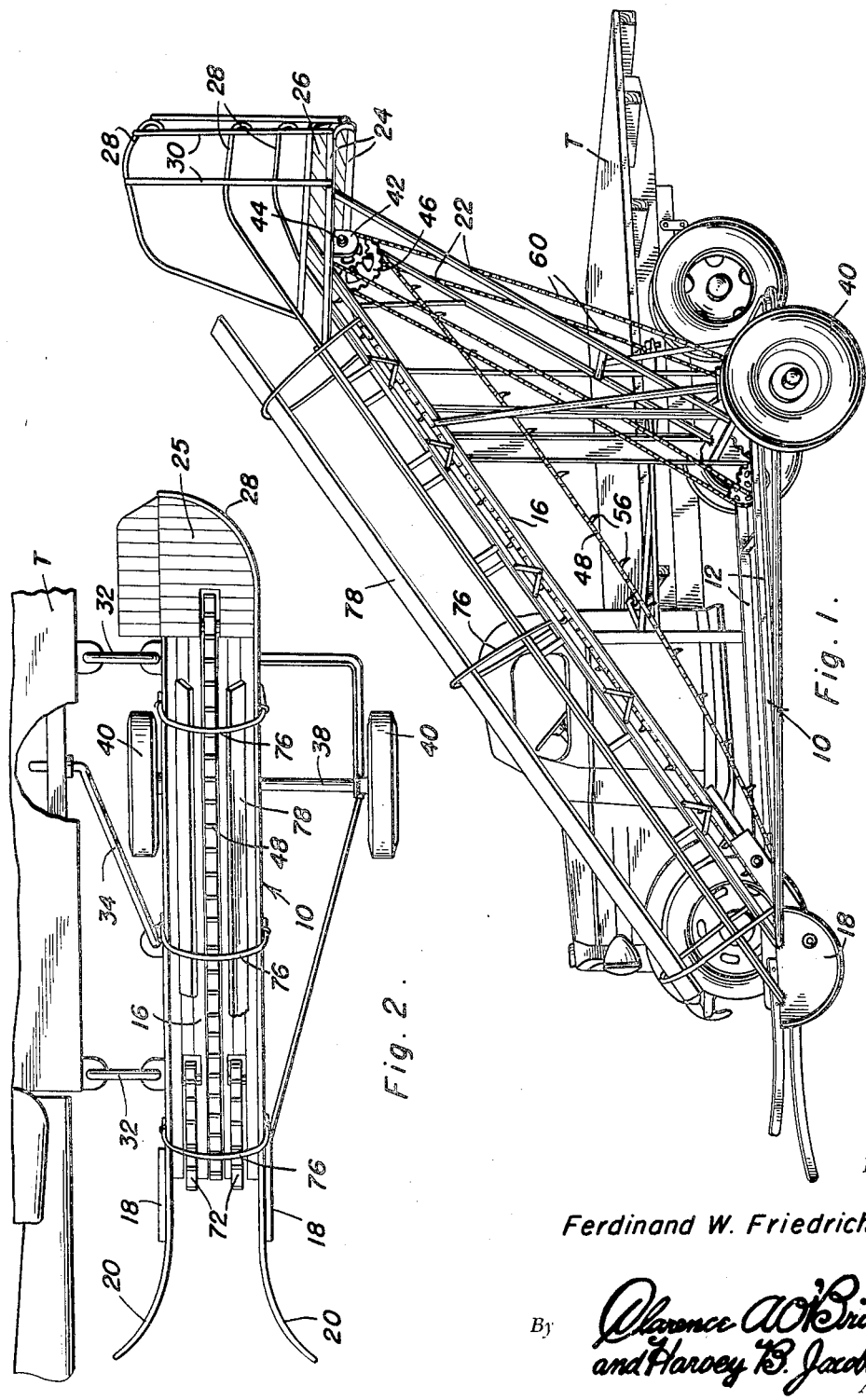
Inventor
Ferdinand W. Friedrich
By Clarence A. O'Brien
and Harvey B. Jacobson
Attorneys May 16, 1950        F. W. FRIEDRICH        2,507,627
BALE LOADER
Filed May 7, 1948                                                                 4 Sheets-Sheet 2
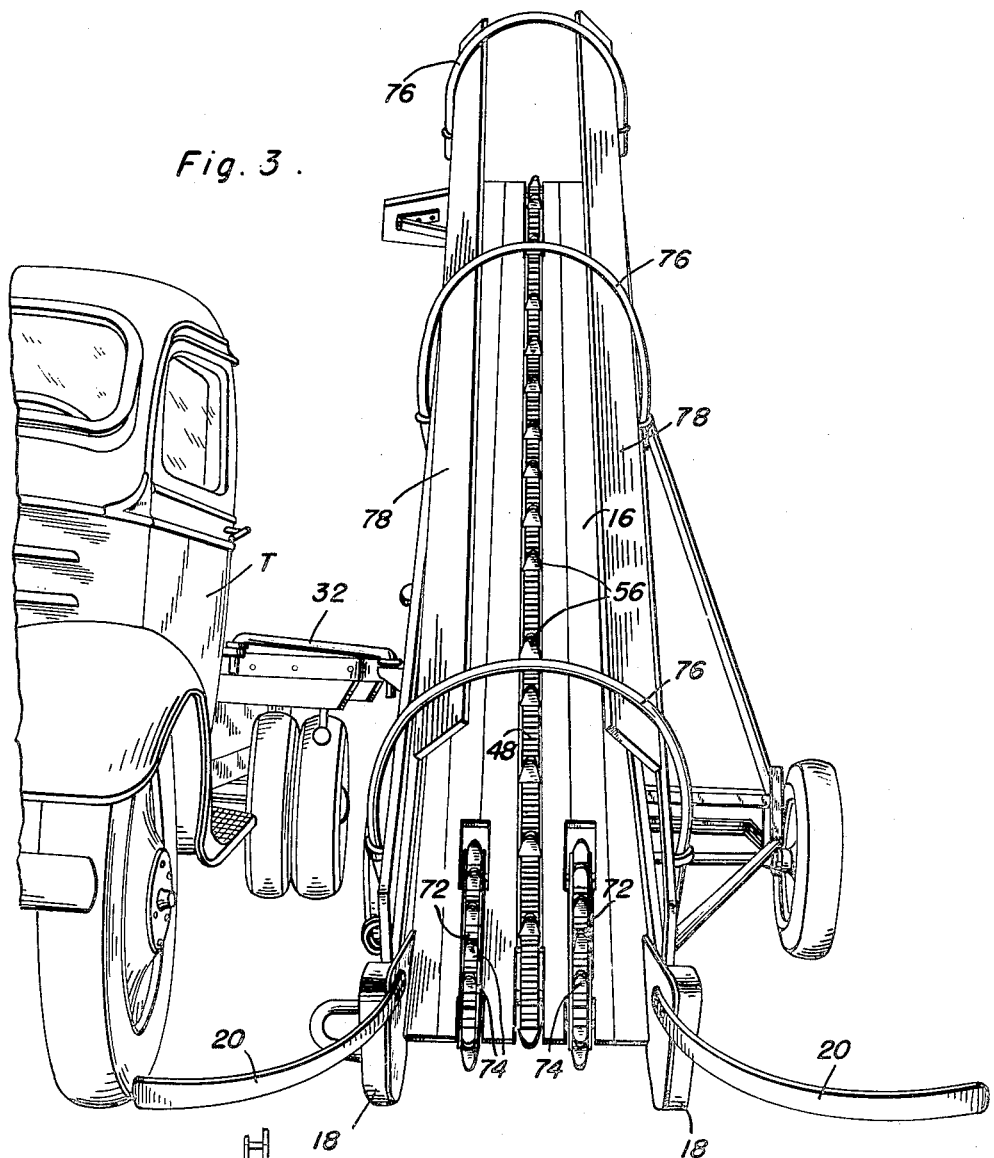
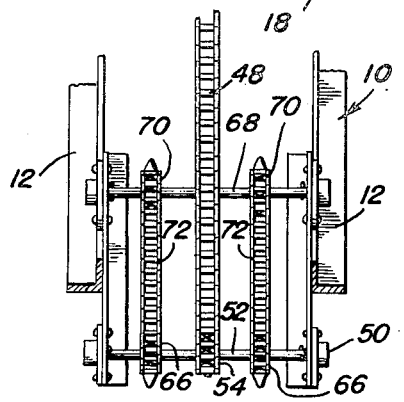
Inventor
Ferdinand W. Friedrich
By Clarence A. O'Brien
and Harvey B. Jacobson
Attorneys

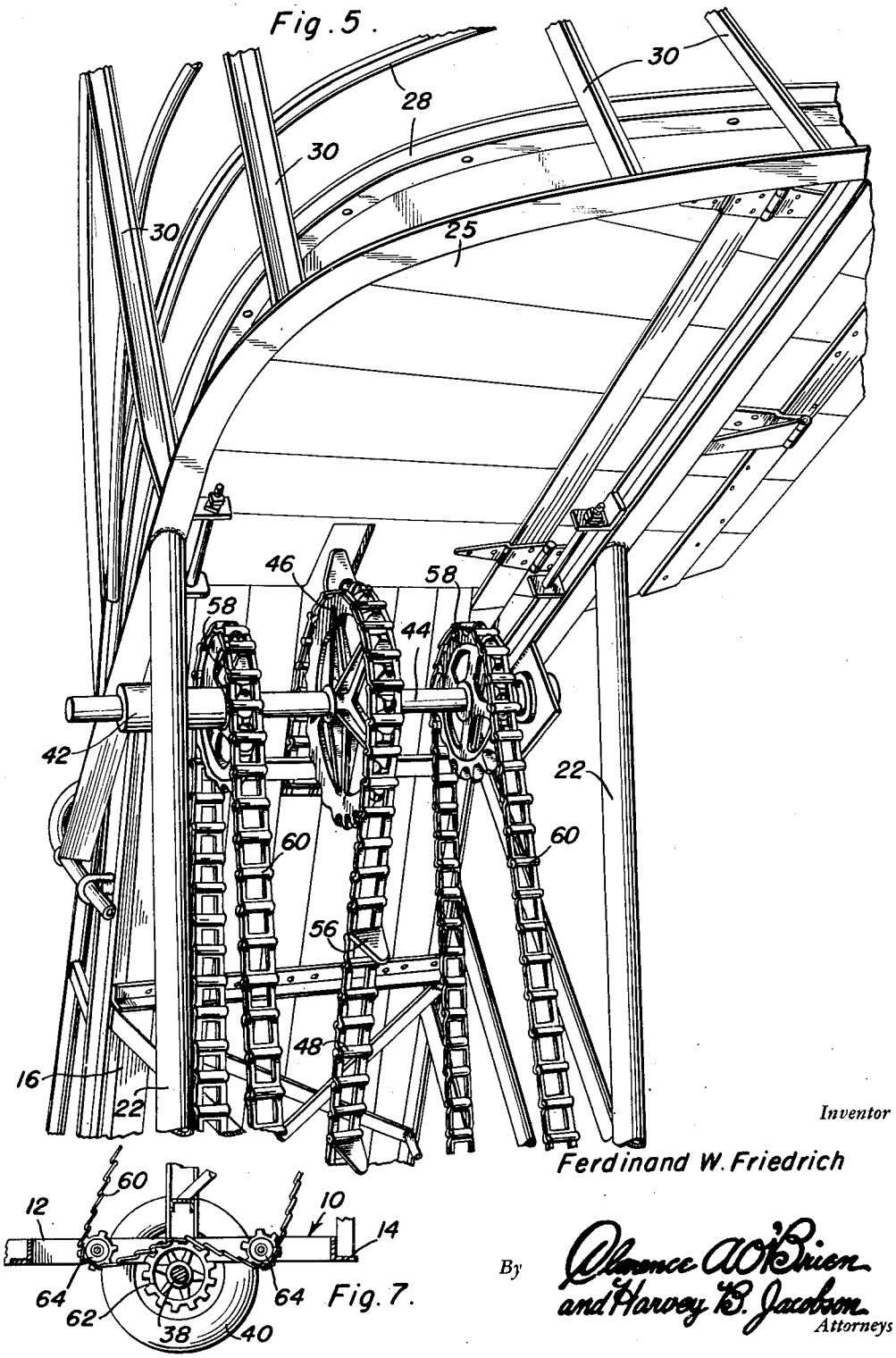

Patented May 16, 1950

2,507,627

UNITED STATES PATENT OFFICE 2,507,627

BALE LOADER

Ferdinand W. Friedrich, Boonville, Mo.

Application May 7, 1948, Serial No. 25,690

1 Claim. (Cl. 214—42)

This invention relates to a bale loader and has for its primary object to elevate successive bales to a position above the level of a truck bed, and to discharge the bales onto the truck bed.

Another object is to provide a piece of equipment which may be attached to the side of a truck for advance in unison therewith and to supply the driving power for the elevating conveyor by the advance of the loader with the truck.

The above and other objects may be attained by employing this invention which embodies among its features an elongated frame, supporting skids at the forward end of the frame, an axle mounted in the frame adjacent its rear end to rotate about a horizontal axis which lies perpendicular to the longitudinal axis of the frame, a standard rising from each side of the frame adjacent the rear end thereof, a drive shaft mounted on the standards adjacent their upper ends to rotate about an axis which lies parallel to the axle, frame supporting wheels on opposite ends of the axle, at least one of said wheels being fixed to the axle to cause the latter to rotate as the wheel is rotated, a pair of spaced drive sprockets fixed to the axle to rotate therewith, an idler sprocket mounted on the frame on each side of each drive sprocket to rotate about an axis which lies parallel with the axle, spaced drive sprockets on the drive shaft aligning with the sprockets on the axle, an endless drive chain trained over each sprocket on the drive shaft, opposite runs of each drive chain engaging the underside of the idler sprockets on its respective side of the frame, the portions of the chains which extend between the idler sprockets running over the top of the sprockets on the axle on its respective side of the frame, an upwardly and rearwardly inclined chute extending from the front end of the frame to the upper ends of the standard, an elevator idler sprocket mounted adjacent the lower end of the chute to rotate about an axis which lies parallel with the axle, an elevator drive sprocket fixed to the drive shaft adjacent the upper end of the chute, an endless elevator chain trained over the elevator drive sprocket and the elevator idler sprockets, the upper run of said elevator chain running along the upper side of the chute for elevating bales from the lower end of the chute to the upper end thereof, a bale receiving platform at the upper end of the chute, means for guiding a bale and discharging it laterally from the platform onto the bed of a truck, and coupling means for connecting the loader to one side of the truck upon which the bales are deposited from the platform.

In the drawings:

Figure 1 is a side view in perspective of a bale loader embodying the features of this invention showing it beside a truck, Figure 2 is a top plan view of the bale loader illustrated in Figure 1 and showing it coupled to a truck, Figure 3 is a front view of the truck and bale loader, Figure 4 is a fragmentary perspective view of the rear end of the bale loader illustrating the drive chains for the elevator in detail, Figure 5 is a view similar to Figure 4 showing the upper ends of the drive chains in driving connection with the elevator chain, Figure 6 is a fragmentary sectional view illustrating the manner in which the auxiliary elevator chains are driven, and Figure 7 is a fragmentary detailed sectional view illustrating the lower drive for the drive chains of the elevator.

Referring to the drawings in detail, an elongated frame 10 comprises spaced parallel side bars 12 jointed at their rear ends by a transversely extending cross bar 14 and supported in spaced parallel relation at their forward ends by opposite sides of a chute 16 which inclines upwardly from the forward end of the frame to a point above the rear end thereof. Attached to the side bars 10 adjacent their forward ends are skids 18, and projecting forwardly from the forward ends of the side bars 12 are outwardly curved guides 20 which assist in guiding bales onto the chute 16. Projecting upwardly and rearwardly from opposite sides of the frame 10, adjacent its rear ends are spaced parallel standards 22 carrying at their upper ends a supporting frame 24 for a platform 26. The forward end of the platform 26 is jointed to the upper rear end of the chute 16 so that bales moving up the chute will be received on the platform 26. Guide rails 28 are attached to standards 30 which project upwardly from the platform 26 and the guide rails 28 curve as they approach the rear end of the platform to cause bales received on the platform to follow an arcuate path and be discharged to one side of the loader. The frame 10 is coupled in any suitable manner as by couplings 32 to one side of a truck T upon the bed of which the bales discharged from the platform 26 are deposited. A traction coupling 34 establishes connection between the truck T and the loader so that as the truck advances, the loader will move in unison with it.

Mounted for rotation in suitable bearings 36 carried by the frame 10 adjacent its rear end is an axle 38 carrying at opposite ends ground contacting wheels 40 at least one of which is fixed to the axle so that as the wheel rotates, the axle 38 will be driven. Carried by the standards 22 at the junction of the upper end of the chute 16 and the platform 26 are suitable bearings 42 in which the drive shaft 44 of an elevator chain is mounted to rotate. This drive shaft has fixed thereto intermediate its ends, a drive sprocket 46 over which is trained an endless elevator chain 48. Adjacent the lower end of the chute 16 are suitable bearings 50 in which an idler shaft 52 is mounted to rotate. The shaft 52 extends parallel to the axle 38 and the drive shaft 44 and carries an idler sprocket 54 over which the elevator chain 48 is trained. The sprockets 46 and 54 are so arranged with relation to the chute 16 as to cause the upper run of the elevator chain 48 to ride on the upper face of the chute, and the elevator chain is provided at longitudinally spaced points with outwardly extending bale engaging teeth 56 which serve to engage the bales and cause them to move in unison with the elevator chain. Fixed to the elevator drive shaft 44 adjacent opposite ends thereof are driven sprockets 58 over which drive chains 60 are trained. And fixed to the axle 38 adjacent opposite side bars 12 of the frame 10 are drive sprockets 62. An idler sprocket 64 is mounted in the frame 10 on each side of each sprocket 62 to rotate about axes which lie parallel to the axle 38 and the drive chains 60 are so arranged that their rearmost runs engage the undersides of the sprockets 64 while the bottommost runs of the chains 60 engage the tops of the sprockets 62. It will thus be seen that as the axle 38 turns with the advance of the truck T in a forward direction, the drive shaft 44 will be driven in a reverse direction, thus causing the elevator chain 48 to move upwardly over the upper surface of the chute 16.

Mounted on the idler shaft 54 adjacent opposite sides of the frame 10 are drive sprockets 66, and mounted on the underside of the chute 16 adjacent its lower end in spaced parallel relation to the idler shaft 52 is an idler shaft 68 supporting adjacent opposite ends idler sprockets 70. Auxiliary elevator chains 72 are trained over the sprockets 66 and 70 to aid in the initial starting of a bale up the chute 16. Like the chain 48, the chains 72 are provided with outwardly extending bale engaging teeth 74.

Secured to opposite sides of the chute 16 at spaced intervals throughout its length are arched supporting members 76 carrying adjacent their upper ends spaced parallel guide boards 78 which extend throughout the entire length of the chute and serve to hold the bales in contact with the teeth 56 during their movement toward the platform 25.

In use the bale loader is coupled to the truck as illustrated in Figure 2 and the device advanced with the truck. As a bale is encountered the guides 20 will effectively guide it toward the lower end of the chute 16 and upon encountering the elevator chains 48 and 72, the bale will be moved upwardly along the chute beneath the guide boards 78. Arriving at the upper end of the chute, the bales are deposited on the platform, and as successive bales engage those on the platform, they will be guided by the guide bars 28 to the side of the platform from which they are dropped onto the platform of the truck T. Obviously as the wheels 40 rotate, the axle 38 will be driven and hence the power transmitted thereto will be transmitted by means of the chains 60 to the shaft 44 to drive the elevator chain 48.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In a bale loader an elongated frame, supporting skids at the forward end of the frame, an axle mounted in the frame adjacent its rear end to rotate about a horizontal axis which lies perpendicular to the longitudinal axis of the frame, a standard rising from each side of the frame adjacent the rear end thereof, a drive shaft mounted on the standards adjacent their upper ends to rotate about an axis which lies parallel to the axle, frame supporting wheels on opposite ends of the axle, at least one of said wheels being fixed to the axle to rotate therewith, a pair of spaced drive sprockets fixed to the axle to rotate therewith, an idler sprocket mounted on the frame on each side of each drive sprocket to rotate about an axis which lies parallel with the axle, spaced drive sprockets on the drive shaft aligning with the sprockets on the axle, an endless drive chain trained over each sprocket on the drive shaft, opposite runs of each drive chain engaging the undersides of the idler sprockets on its respective side of the frame, the portions of the chains which extend between the idler sprockets running over the top of the sprocket on the axle on its respective side of the frame, an upwardly and rearwardly inclined chute extending from the front end of the frame to the upper ends of the standards, an elevator idler sprocket mounted adjacent the lower end of the chute to rotate about an axis which lies parallel with the axle, an elevator drive sprocket fixed to the drive shaft, an endless elevator chain trained over the elevator drive sprocket and the elevator idler sprocket, the upper run of said elevator chain running along the upper side of the chute for elevating bales from the lower end of the chute to the upper end thereof, a bale receiving platform at the upper end of the chute, means for guiding a bale and discharging it laterally from the platform and coupling means for connecting the loader to one side of a vehicle upon which the bales are to be loaded, said coupling means being adapted to advance the loader in unison with the vehicle, outwardly and forwarding extending bale guides projecting forwardly from opposite sides of the chute, an auxiliary bale elevating chain on each side of the first mentioned bale elevating chain adjacent the lower end of the chute and means coupled to the first mentioned bale elevating chains for operating the auxiliary chains in unison therewith.

FERDINAND W. FRIEDRICH.

REFERENCES CITED

The following references are of record in the file of this patent:

UNITED STATES PATENTS

| Number | Name | Date |
| --- | --- | --- |
| 1,213,077 | Collier | Jan. 16, 1917 |
| 1,853,253 | Bennett | Apr. 12, 1932 |
| 2,397,570 | Smoker | Apr. 2, 1946 |
| 2,427,324 | Farr et al. | Sept. 9, 1947 |